Dec. 17, 1929.  C. C. FARMER  1,739,584
ANGLE COCK DEVICE
Filed April 5, 1928
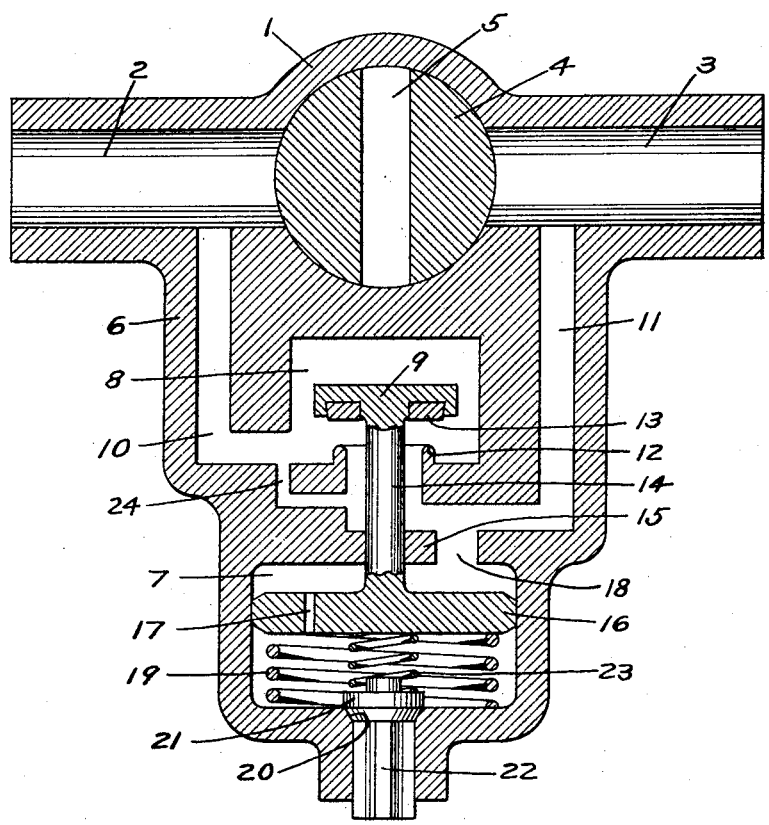
INVENTOR
CLYDE C. FARMER
BY *Wm. M. Cady*
ATTORNEY Patented Dec. 17, 1929

1,739,584

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

ANGLE-COCK DEVICE

Application filed April 5, 1928. Serial No. 267,504.

This invention relates to fluid pressure brake systems and more particularly to an angle cock device of the type embodying a by-pass, to permit communication to be had around the plug valve, in case the plug valve of the angle cock should be inadvertently closed, so that the brakes may be applied and released when the brake pipe pressure is varied in the usual manner and has for its object to improve the construction of angle cocks of this type.

As shown in the drawing, the single figure is a diagrammatic sectional view of an angle cock device embodying my invention.

According to the drawing, the cock device may comprise a casing 1 having a passageway 2 adapted to be connected to the usual brake pipe and a passageway 3 adapted to be connected to the usual flexible hose.

Interposed between passageways 2 and 3 is a plug valve 4 having a central opening 5 for controlling communication between said passageways, and this valve is actuated in the ordinary manner.

According to this invention, the casing 1 is provided with a laterally extending body 6 containing a piston chamber 7 and a valve chamber 8.

A poppet valve 9 is arranged in the valve chamber 8 and is provided for controlling communication between the by-pass passages 10 and 11 leading respectively to the passageways 2 and 3. This valve 9 is adapted to seat upon an annular seat rib 12 and the valve may be provided with a washer 13 for engaging said seat 12. This valve 9 is provided with a stem 14 slidably mounted in a suitable guide 15 and this stem is connected with a piston 16. The piston 16 is slidably mounted in the piston chamber 7 and has a restricted port 17 formed therein. The passage 11 has communication with the inner end of the piston chamber 7 through a suitable passage 18.

Disposed in the piston chamber 7, on the outer side of the piston 16, is an expansion coil spring 19, which bears against the piston and one of the end chamber walls. This end chamber wall is provided with an atmospheric port 20, normally closed by a manually operated vent valve 21, having a fluted stem 22, which extends exteriorly of the piston chamber. This valve 21 can be held on its seat in any desired way, such as by the use of a coil spring 23 engaging the valve 21 and piston 16 respectively. A restricted passage 24 is provided for maintaining communication through said by-pass when the valve 9 is closed.

In operation, with the plug valve 4 in open position, the brake pipe is charged through passageway 2, opening 5 in the plug valve 4, and passageway 3, in the usual manner.

Fluid under pressure in the passageway 2, when the poppet valve 9 is seated, flows through restricted passage 24 and passageway 18, into piston chamber 7. The air then flows through port 17, and when the pressure of air becomes equalized on each side of the piston in the chamber 7, the spring 19 functions to move the piston 16 inward and the valve 9 off of its seat 12. This establishes communication between passages 10 and 11 and should the plug valve 4 be closed, inadvertently or otherwise, the said passages 10 and 11, which constitute a by-pass, permit the operation of the brakes in the usual way.

When it is desired to uncouple, a pair of cars, pressure can be exerted on the fluted stem 22 of the vent valve 21 of the angle cock device on each car, which will allow the quick release of pressure on the outer side of the piston, causing the pressure on the inner face of the piston to seat the valve 9 and close communication between the passages 10 and 11.

Pressure can now be released on the vent valve of the car being uncoupled, and the car can now be uncoupled in the usual way.

The restricted passage 24 is provided so that passage of a small quantity of air around the valve 9 is permitted should the valve 9 remain closed for any reason, so that equalization of pressure on each side of the piston 16 will be assured. The size of the passage is so small that the leakage of air into the atmosphere, through passage 11 and passageway 3 will be negligible. However, a dummy coupling can be used to avoid this leakage.

The port 17 in the piston 16 is also of such a small size, that leakage of compressed air into the atmosphere will be negligible, when the vent valve 21 is open. This port 17 is sufficient in size, however, to permit the building up of pressure in the chamber 7 on the outer side of the piston, when the vent valve 21 is in normal closed position.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. An angle cock device comprising a plug cock and having a by-pass around said cock, a valve for controlling communication through said by-pass, a piston subject on one side to the pressure of fluid in said by-pass and having means for permitting equalization of fluid pressure on opposite sides of said piston, and a manually operated valve for venting fluid under pressure from one side of said piston.

2. An angle cock device comprising a plug cock and having a by-pass around said cock, a valve for controlling communication through said by-pass, a piston subject on one side to the pressure of fluid in said by-pass and having means for permitting equalization of fluid pressure on opposite sides of said piston, spring means for moving the piston in one direction and the valve off of its seat, when said pressure is equalized, and a manually operated valve for venting fluid under pressure from the spring side of said piston.

3. An angle cock device comprising a plug cock and having a by-pass around said cock, a valve for controlling communication through said by-pass, a piston subject on one side to the pressure of fluid in said by-pass and having means for permitting equalization of fluid pressure on opposite sides of said piston, and a manually operated valve for venting fluid under pressure from one side of said piston, said first mentioned valve, piston and vent valve being arranged in direct axial alignment.

4. An angle cock device comprising a plug cock and having a by-pass, a valve for controlling communication through said by-pass, a piston subject on one side to the pressure of fluid in said by-pass, said piston having a restricted port formed directly therein for permitting equalization of fluid pressure on opposite sides of said piston, and a manually operated valve for venting fluid under pressure from one side of said piston.

In testimony whereof I have hereunto set my hand.

CLYDE C. FARMER.